United States Patent
Park et al.

(10) Patent No.: US 10,570,309 B2
(45) Date of Patent: Feb. 25, 2020

(54) COMPOSITION FOR ANTIFOGGING COATING AND COATING FILM INCLUDING THE ANTIFOGGING COATING

(71) Applicant: KUKDO CHEMICAL CO., LTD., Seoul (KR)

(72) Inventors: Sung June Park, Osan-si (KR); Hye Seung Lee, Seoul (KR); Joong Hwi Jee, Seoul (KR); Chan Ho Park, Bucheon-si (KR)

(73) Assignee: Kukdo Chemical Co., Ltd., Seoul (KR)

( * ) Notice: Subject to any disclaimer, the term of this patent is extended or adjusted under 35 U.S.C. 154(b) by 4 days.

(21) Appl. No.: 15/262,641

(22) Filed: Sep. 12, 2016

(65) Prior Publication Data

US 2017/0183532 A1 Jun. 29, 2017

(30) Foreign Application Priority Data

Dec. 28, 2015 (KR) .......................... 10-2015-0187896

(51) Int. Cl.
| | |
|---|---|
| C09D 163/00 | (2006.01) |
| C09D 5/00 | (2006.01) |
| C08G 59/26 | (2006.01) |
| C08G 59/50 | (2006.01) |
| C08G 59/68 | (2006.01) |
| C09D 5/16 | (2006.01) |

(52) U.S. Cl.
CPC ........... *C09D 163/00* (2013.01); *C08G 59/26* (2013.01); *C08G 59/504* (2013.01); *C08G 59/686* (2013.01); *C09D 5/00* (2013.01); *C09D 5/1662* (2013.01)

(58) Field of Classification Search
CPC .................................................. C09D 163/00
See application file for complete search history.

(56) References Cited

U.S. PATENT DOCUMENTS

| | | | | |
|---|---|---|---|---|
| 3,932,557 A | * | 1/1976 | Matthews ........... | C08F 299/026 525/54.1 |
| 2008/0009599 A1 | * | 1/2008 | East ..................... | C07D 493/04 528/1 |
| 2009/0226729 A1 | * | 9/2009 | Niimoto ............. | C08G 59/4007 428/416 |
| 2013/0184477 A1 | * | 7/2013 | Gilbeau ............... | C07D 301/26 549/513 |
| 2016/0122581 A1 | * | 5/2016 | You ........................ | C08F 283/10 428/35.8 |
| 2016/0130463 A1 | * | 5/2016 | Sugihara .................. | C09D 5/00 428/335 |

FOREIGN PATENT DOCUMENTS

| | | |
|---|---|---|
| JP | 05-179233 A | 7/1993 |
| JP | 2004-269851 A | 9/2004 |
| JP | 2007-002034 A | 1/2007 |
| KR | 10-0798745 B1 | 1/2008 |
| KR | 10-0943026 B1 | 2/2010 |
| KR | 10-1110845 B1 | 2/2012 |
| KR | 10-1322577 B1 | 10/2013 |
| WO | 2008-111564 A1 | 9/2008 |

OTHER PUBLICATIONS

Jan Lukaszczyk et al., "Synthesis and properties of isosorbide based epoxy resin", European Polymer Journal 47 (May 14, 2011), pp. 1601-1606.

* cited by examiner

*Primary Examiner* — Megan McCulley

(74) *Attorney, Agent, or Firm* — Morgan, Lewis & Bockius LLP

(57) ABSTRACT

A composition for an antifogging coating includes isosorbide epoxy represented by Formula 1 below, a hardener, a hardening accelerator, and a silane coupling agent,

[Formula 1]

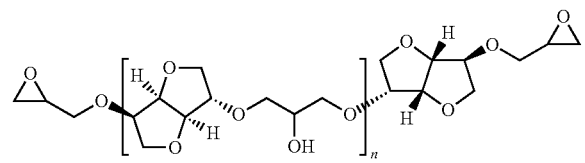

wherein n is 0.2 to 7.

9 Claims, 4 Drawing Sheets

COMPOSITION FOR ANTIFOGGING COATING AND COATING FILM INCLUDING THE ANTIFOGGING COATING

CROSS-REFERENCE TO RELATED APPLICATION

This application claims under 35 U.S.C. § 119(a) the benefit of priority to Korean Patent Application No. 10-2015-0187896, filed on Dec. 28, 2015 with the Korean Intellectual Property Office, the entire contents of which are incorporated herein by reference.

TECHNICAL FIELD

The present disclosure relates to a composition for antifogging coating having superior water absorption and a coating film for antifogging using the antifogging coating.

BACKGROUND

Fogging is a phenomenon which occurs due to water droplets condensed on the surface of an object when a surface temperature of the object is around a dew point. Here, when an angle between a condensed water droplet and a surface of an object is large, a globular water droplet is formed. Light is scattered at water droplets formed in this way and thus a surface of an object is visually clouded.

Since transparency of solar cells, displays, glasses, and vehicle glasses is decreased due to such fogging, optical devices do not exhibit normal characteristics when fogging occurs. In particular, in the case of vehicles, fogging is often generated on a surface of a front glass due to a difference between an interior temperature and an exterior temperature, which disturbs a driver's view and, accordingly, may decrease driver safety.

As technology to prevent fogging, a technology of manufacturing an ultra-hydrophilic surface by forming minute structures on a surface has been used. Since the ultra-hydrophilic surface has a contact angle of 10° or less to water, water droplets are not formed on the ultra-hydrophilic surface and spread rapidly, whereby light is not scattered. However, such a surface has a disadvantage that the structures are too minute and thus it is difficult to maintain the shapes thereof when pressure and abrasion from the outside are applied thereto. Therefore, the structures cannot be applied to products, such as vehicles and exterior glass of buildings, requiring high durability.

Recently, research into technologies of preventing fogging by forming a coating film using epoxy resin exhibiting water absorption on a surface of a product is actively underway.

Korean Patent No. 10-1322577 discloses an anti-fogging article having a crosslinked resin layer that includes a polyepoxide-based substance and a hardener. However, this disclosure has a limitation wherein a saturated water absorption amount is not high and thus anti-fogging performance cannot be continuously maintained.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

It is an object of the present disclosure to provide a composition for antifogging, which can continuously prevent fogging due to high water absorption and saturated water absorption amount thereof, and a coating film including the same.

It is another object of the present disclosure to provide a composition for antifogging coating which is suitable for windows of vehicles (automobiles, trains, ships, airplanes, etc.) or exterior glass of buildings due to high durability and superior chemical resistance and light resistance thereof, and a coating film including the same.

It is another object of the present disclosure to provide a composition for antifogging coating which has high adhesion to glass, etc. and thus excludes application of a separate bonding layer (or adhesion increasing layer), and a coating film including the same.

It is yet another object of the present disclosure to provide a composition for antifogging coating which has high light transmissivity and thus does not affect optical characteristics of substrates such as glass, and a coating film including the same.

Objects of the present disclosure are not limited to the aforementioned objects. The objects will be clarified through the following descriptions and accomplished through means disclosed in the following claims and combinations thereof.

In accordance with the present disclosure, the above and other objects can be accomplished by the provision of a composition for an antifogging coating including isosorbide epoxy represented by Formula 1 below, a hardener, a hardening accelerator, and a silane coupling agent,

[Formula 1]

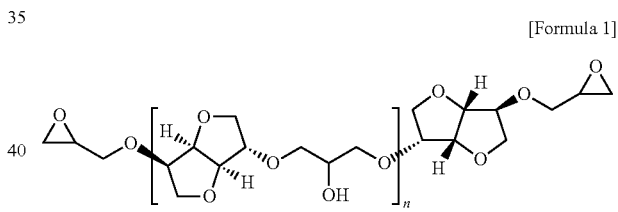

wherein n is 0.2 to 7.

The hardener may be a polyamine-based compound including active hydrogen.

The hardener may be one or more selected from ethylenediamine, trimethylenetetramine, tetraethylenepentamine polyamine, isophoronediamine, polypropylenediamine, triethylene glycol diamine, and polyoxypropylenetriamine.

A ratio of the equivalent weight of active hydrogen in the hardener to the equivalent weight of the isosorbide epoxy may be 0.7 to 0.95.

The hardening accelerator may be one or more from an imidazole-based compound and a tertiary amine-based compound.

The imidazole-based compound may be one or more selected from imidazole, 2-methylimidazole, 2-ethyl-4-methylimidazole, and 1-cyanoethyl-2-ethyl-4-methylimidazole, and the tertiary amine-based compound is one or more selected from tributylamine, benzyldimethylamine, trimethylamine, and benzyldimethylamine.

The silane coupling agent may be an epoxy silane-based compound.

The epoxy silane-based compound may be one or more selected from 2-(3,4 epoxycyclohexyl)ethyltrimethoxysilane, 3-glycidoxypropyltrimethoxysilane, 3-glycidoxypropylmethyldiethoxysilane and 3-glycidylpropyltriethoxysilane.

The composition may include 30 to 50 parts by weight of the hardener, 0.1 to 3.0 parts by weight of the hardening accelerator, and 10 to 30 parts by weight of the silane coupling agent, based on 100 parts by weight of the isosorbide epoxy.

In accordance with another aspect of the present disclosure, the above and other objects can be accomplished by the provision of a coating film for antifogging formed of the composition.

The thickness of the coating film for antifogging may be 1 to 100 μm. Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
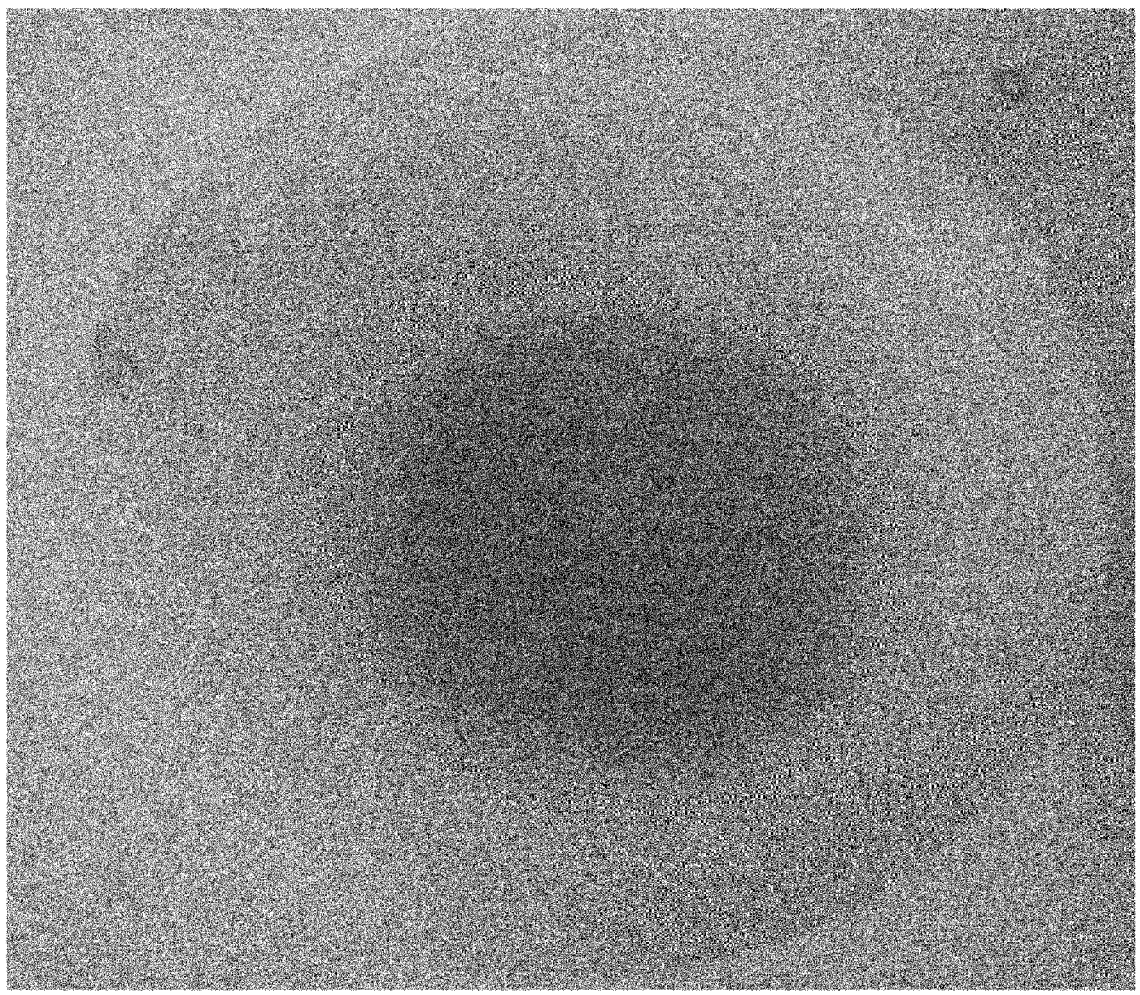
FIG. 1 illustrates an experimental result of a coating film, which is prepared according to a comparative example, according to Experimental Example 1.

It should be understood that the appended drawings are not necessarily to scale, and may present a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalent weights and other embodiments, which may be included within the spirit and scope of the disclosure as defined by the appended claims.

In the description of the present disclosure, descriptions of known configurations and functions may be omitted when it is deemed that they may unnecessarily obscure the essence of the disclosure.

In addition, when a certain part "includes" a certain component, this indicates that the part may further include other components instead of excluding other components unless there is no different disclosure.

A composition for an antifogging coating (hereinafter referred to as "composition for coating") according to the present disclosure may include an isosorbide epoxy, a hardener, a hardening accelerator and a silane coupling agent.

The composition for coating may include isosorbide epoxy represented by Formula 1 below as a water absorption resin:

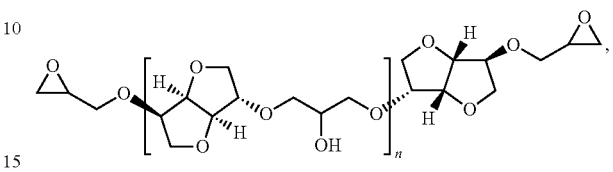

[Formula 1]

wherein n may be 0.2 to 7.

The isosorbide epoxy may have a high hydrogen bonding density, compared with bisphenol-A based water absorption resins. Therefore, the composition for coating including the isosorbide epoxy may have an increased saturated water absorption amount.

In addition, since the isosorbide epoxy may include a ring structure, a coating film for antifogging formed of the isosorbide epoxy may have increased durability.

In Formula 1, n may be 0.2 to 7. The hydrogen bonding density and the ring structure content of the isosorbide epoxy may depend upon the value of n. When n is less than 0.2, the saturated water absorption amount of the composition for coating may not be sufficiently increased. In addition, when n is greater than 7, the molecular weight of the isosorbide epoxy may be too large and the chain length thereof may be too long, whereby the isosorbide epoxy may not be uniformly distributed in a composition for coating. In addition, since the liquidity of the composition for coating may be decreased, there may be a problem in forming a coating film.

The composition for coating may have a technical characteristic in that adhesion thereof to substrates such as glass is increased by the isosorbide epoxy with a hardener and a hardening accelerator. That is, even when the composition for coating is coated on a substrate and then hardened without application of a separate bonding layer (adhesive), the coated film may have high adhesion to the substrate. Therefore, the film may have a simple structure and may be prepared through a simple process.

In addition, the composition for coating additionally may include a silane coupling agent, and thus may exhibit further increased adhesion to a substrate.

The hardener may be a polyamine-based compound including active hydrogen. The hardener is preferably an aliphatic polyamine, an aryl aliphatic polyamine, a cycloaliphatic polyamine, an aromatic polyamine or a polyetheramine compound. In particular, the hardener may be one or more selected from ethylenediamine, trimethylenetetramine, tetraethylenepentamine polyamine, isophoronediamine, polypropylenediamine, triethylene glycol diamine, and a polyoxypropylenetriamine compound.

The hardener is preferably used in an amount in which a ratio of the equivalent weight of active hydrogen in the hardener to the equivalent weight of the isosorbide epoxy is 0.7 to 0.95. Accordingly, the composition for coating preferably includes 30 to 50 parts by weight of the hardener based on 100 parts by weight of the isosorbide epoxy.

The equivalent weight of the isosorbide epoxy may be calculated according to Equation 1 below.

$$\frac{\text{MOLECULAR WEIGHT OF ISOSORBIDE}}{\text{EPOXY REPRESENTED BY FORMULA 1}} \atop {\text{NUMBER OF EPOXY GROUPS} \atop \text{INCLUDED IN ISOSORBIDE EPOXY} \atop \text{REPRESENTED BY FORMULA 1}} \quad \text{[Equation 1]}$$

The equivalent weight of active hydrogen in the hardener may be calculated according to Equation 2 below.

$$\frac{\text{MOLECULAR WEIGHT OF HARDENER}}{\text{NUMBER OF ACTIVE HYDROGENS}} \quad \text{[Equation 2]}$$

In the present specification, the expression "active hydrogen" may mean hydrogen participating in hardening among hydrogens at an amine group in the hardener.

When a ratio of the equivalent weight of active hydrogen in the hardener to the equivalent weight of the isosorbide epoxy is 0.7 to 0.95, the composition for coating including the hardener and the isosorbide epoxy may be properly hardened, and thus, may be coated with high adhesion to the substrate.

The hardening accelerator may be an imidazole-based compound or a tertiary amine-based compound. In addition, the hardening accelerator may be a combination of the imidazole-based compound or the tertiary amine-based compound.

The imidazole-based compound may be one or more selected from imidazole, 2-methylimidazole, 2-ethyl-4-methylimidazole and 1-cyanoethyl-2-ethyl-4-methylimidazole.

In addition, the tertiary amine-based compound may be one or more selected from tributylamine, benzyldimethylamine, trimethylamine and benzyldimethylamine.

The composition for coating may include 0.1 to 3.0 parts by weight of the hardening accelerator based on 100 parts by weight of the isosorbide epoxy. When the content of the hardening accelerator is outside the range, hardening may not be normally facilitated.

The silane coupling agent may be an epoxy silane-based compound friendly to the isosorbide epoxy. In particular, the silane coupling agent may be one or more selected from 2-(3,4 epoxycyclohexyl)ethyltrimethoxysilane, 3-glycidoxypropyltrimethoxysilane, 3-glycidoxypropylmethyldiethoxysilane and 3-glycidylpropyltriethoxysilane.

The composition for coating may include 10 to 30 parts by weight of the silane coupling agent based on 100 parts by weight of the isosorbide epoxy. To obtain effects due to the addition of the silane coupling agent, the silane coupling agent may be preferably used in an amount of 10 parts by weight or more. In addition, to prevent the properties, such as absorption, of the isosorbide epoxy from decreasing due to an addition of the silane coupling agent, the isosorbide epoxy may be used in an amount of 30 parts by weight or less.

The coating film for antifogging according to the present disclosure may be formed by coating the composition for coating on a substrate such as glass and then hardening the coated composition.

Although a method of coating the composition for coating is not limited to a specific method, the method may be a spray coating method, a spin coating method, a flow coating method, a dip coating method, a roll coating method or a screen printing method, as a wet coating method.

In addition, a method of hardening the composition for coating is not limited to a specific method and may be properly controlled depending upon the content and the equivalent weight of the hardener. The composition for coating may be hardened by warming at a constant temperature for a constant time.

The coating film for antifogging may be formed to a thickness of 1 to 100 μm. The thickness of the coating film may be 1 μm or more so that a saturated water absorption amount and durability are sufficiently increased. In addition, the thickness of the coating film may be 100 μm or less so that adhesion to a substrate such as glass and light transmissivity is considered and/or enabled.

Hereinafter, the present disclosure will be described in more detail with reference to the following Examples. The scope of the present disclosure is not limited to the following Examples and equally covers modifications of the technical spirit with equivalent weight thereto.

EXAMPLES (1) Preparation of First Composition 100 g of isosorbide epoxy and 23.77 g of 3-glycidoxypropylmethyldiethoxysilane as a silane coupling agent were fed into a glass container with a stirrer and a thermometer.

Here, the isosorbide epoxy had an equivalent weight of 170 g/eq (when n was 1.4).

100 g of propylene glycol mono methyl ether, as an organic solvent, was fed into the glass container.

Stirring was performed at room temperature (about 25° C.) for one hour. As a result, a first composition was prepared.

(2) Preparation of Second Composition 39.8 g of polyoxypropylenetriamine as a hardener, 0.5 g of 2-methylimidazole as a hardening accelerator and 2.0 g of benzyldimethylamine were fed into a glass container equipped with a stirrer and a thermometer.

100 g of ethanol as an organic solvent was fed into the glass container.

Stirring was performed at room temperature (about 25° C.) for one hour. As a result, a second composition was prepared.

(3) Preparation of Composition for Coating

The first composition and the second composition were stirred at room temperature for one hour to obtain a composition for coating.

(4) Preparation of Coating Film for Antifogging

A surface of a soda-lime glass substrate (70 mm×150 mm×2 mm) was polished with cerium oxide, followed by washing.

The composition for coating was spray-coated on the surface of the soda lime glass substrate.

The composition for coating was hardened by warming at 110° C. for one and a half hours. Finally, a coating film for antifogging with a thickness of 60 μm was produced.

Experimental Example 1

Water Absorption Evaluation

Whether water droplets were condensed on the coating film for antifogging according to the example was tested in a hot and humid space with 80° C. vapor.

A soda lime glass substrate on which the coating film for antifogging was not formed was used as a comparative example.

Figure 2:
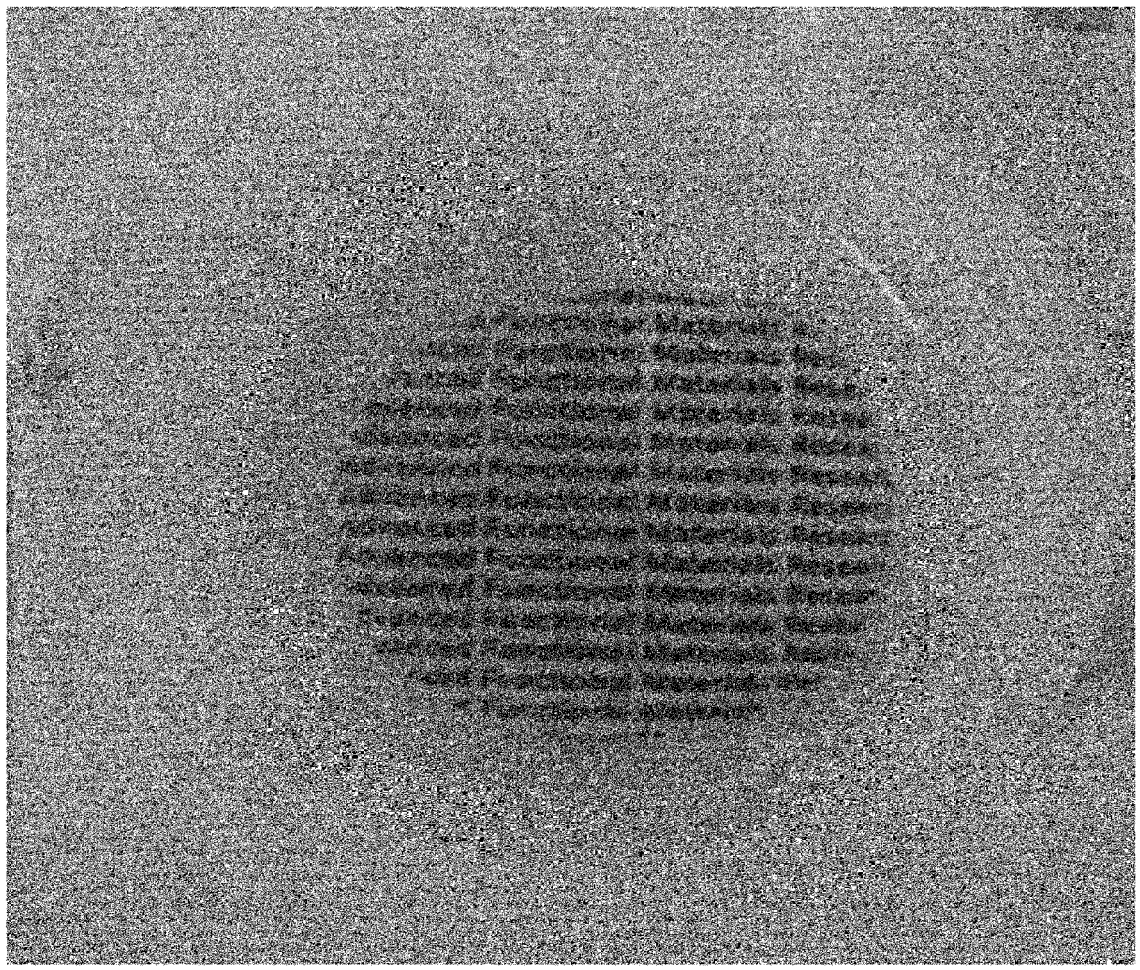
FIG. 2 illustrates an experimental result of a coating film, which is prepared according to an example, according to Experimental Example 1.

Results are illustrated in FIGS. 1 and 2.

FIG. 1 illustrates a result of the comparative example, and FIG. 2 illustrates a result of the example.

Referring to these figures, in the case of the comparative example, haze occurred within 10 seconds in the hot and humid space. This means that minute water droplets were condensed and thus light was scattered.

On the other hand, in the case of the example, haze was not generated and optical characteristics of the glass were not affected, which was also the case after five minutes. This means that water droplets were not formed on the surface and were absorbed. The saturated water absorption amount of the example was confirmed to be about 950 mg/cm$^3$.

Experimental Example 2

Chemical Resistance and Light Resistance Evaluation

The coating film for antifogging according to the example was subjected to the chemical resistance test (resistance test to an acidic/alkaline solution). Subsequently, whether the coating film prevented fogging was evaluated under the same conditions as in Experimental Example 1. A result is illustrated in FIG. 3.

In addition, the coating film for antifogging according to the example was subjected to a light resistance test (resistance to sunlight test). Subsequently, whether the coating film prevented fogging was evaluated under the same conditions as in Experimental Example 1. A result is illustrated in FIG. 4.

Figure 3:
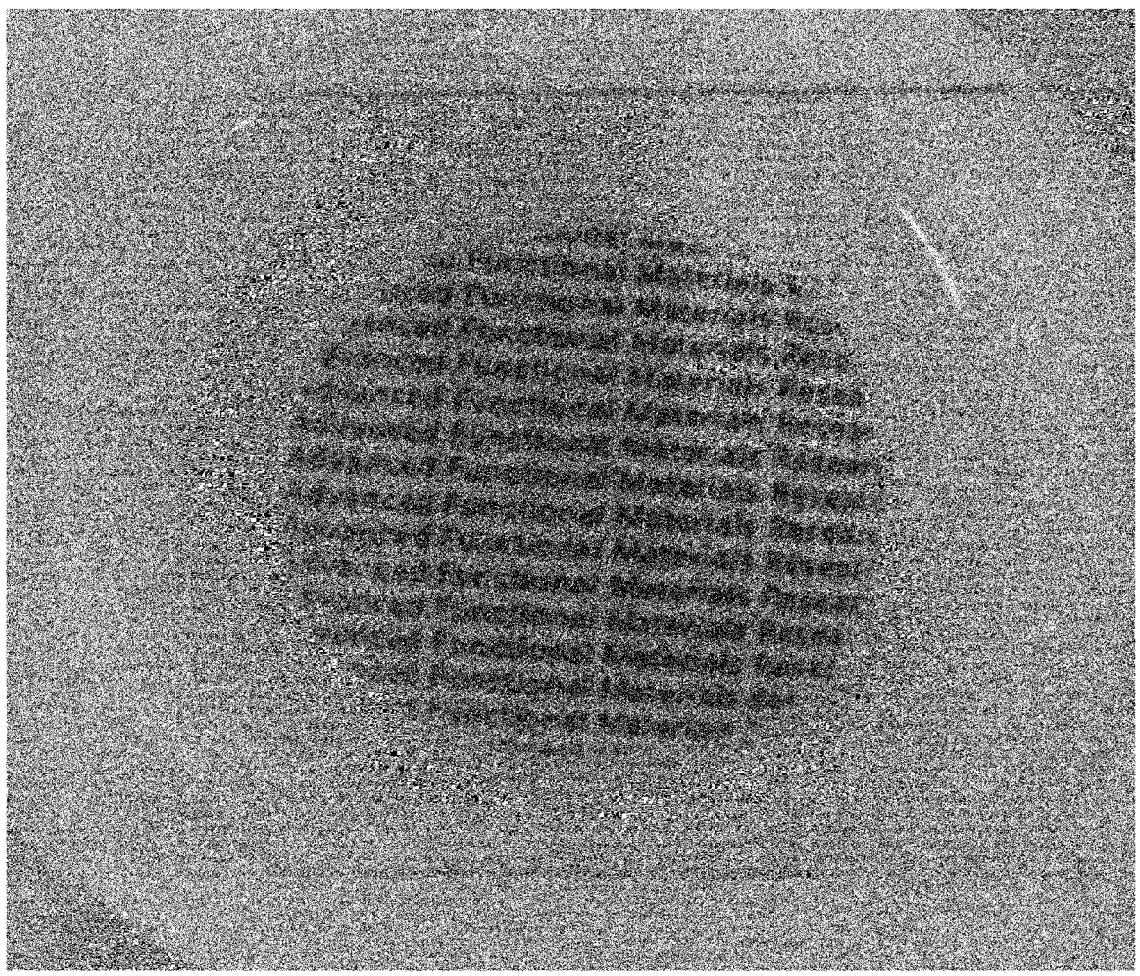
FIG. 3 illustrates a chemical resistance test result of an example of the present disclosure.
Figure 4:
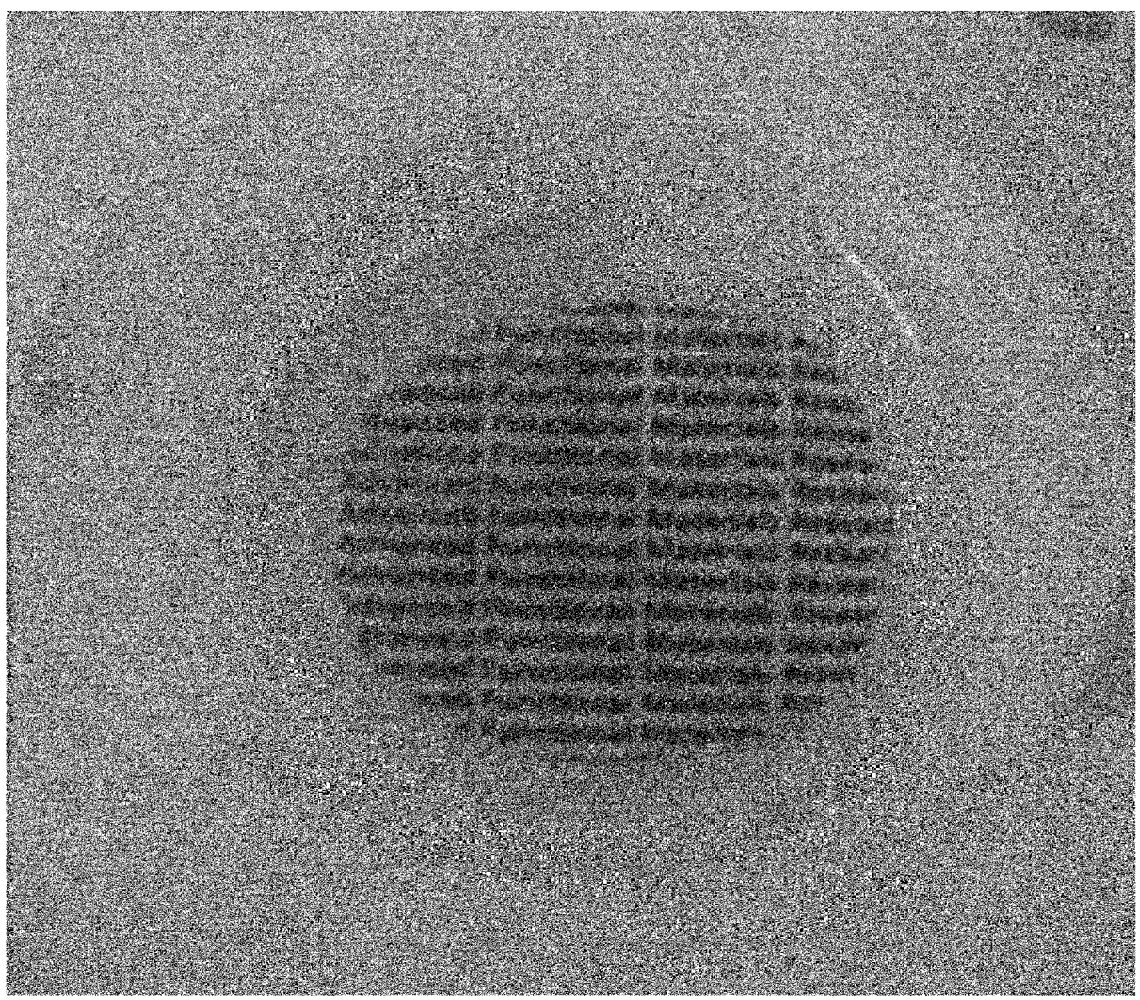
FIG. 4 illustrates a light resistance test result of an example of the present disclosure.

Referring to FIGS. 3 and 4, it can be seen that the coating films are not fogged after the chemical resistance and light resistance tests.

Experimental Example 3

Abrasion Resistance Evaluation

The coating film for antifogging according to the example was subjected to the abrasion resistance test.

The coating film of the example had a haze value of less than 1% after a reciprocating abrasion test with a load of 4.9 N. In addition, a Taber abrasion test wherein a load of 500 g rotated on a surface of the coating film was rotated was performed 150 times. After this test, the coating film of the example had a haze value of less than 5%.

The coating film according to the present disclosure may include the aforementioned configurations, and thus may have the following effects.

The composition for an antifogging coating according to the present disclosure and the coating film including the same may have high water absorption and saturated water absorption amounts, thus effectively preventing fogging for a long time.

In addition, the composition for an antifogging coating according to the present disclosure and the coating film including the same may have a high durability, and satisfactory chemical resistance and light resistance, thus being physicochemically stable. Accordingly, the coating film is suitable for substrates, such as glass, under severe conditions.

In addition, since the composition for an antifogging coating according to the present disclosure and the coating film including the same may have satisfactory adhesion to substrates such as glass, a separate bonding layer may not be required. Accordingly, the structure of the coating film may be simple and a manufacturing process thereof may be simple. Accordingly, production costs of the coating film may be reduced.

Further, the composition for an antifogging coating according to the present disclosure and the coating film including the same may have a high transmissivity, thus not deteriorating optical characteristics of substrates such as glass. Accordingly, user's view may not be disturbed.

Effects of the present disclosure are not limited to the aforementioned effects. It should be understood that effects of the present disclosure include all effects which may be inferred from the following descriptions.

The disclosure has been described in detail with reference to preferred embodiments thereof. However, it will be appreciated by those skilled in the art that changes may be made in these embodiments without departing from the principles and spirit of the disclosure, the scope of which is defined in the appended claims.

What is claimed is:

1. A transparent coating film for antifogging composed of a composition for an antifogging coating, wherein the composition comprises:
    isosorbide epoxy represented by Formula (1) below;
    30 to 50 parts by weight of a hardener, based on 100 parts by weight of the isosorbide epoxy;
    0.1 to 3.0 parts by weight of a hardening accelerator, based on 100 parts by weight of the isosorbide epoxy; and
    10 to 30 parts by weight of a silane coupling agent, based on 100 parts by weight of the isosorbide epoxy,

[Formula 1]

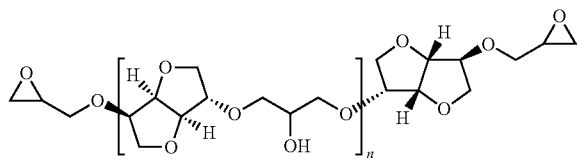

wherein n is 1.4 to 7, and
    wherein the composition further comprises an organic solvent including propylene glycol mono methyl ether.

2. The coating film according to claim 1, wherein the hardener is a polyamine-based compound comprising active hydrogen.

3. The coating film according to claim 2, wherein the hardener is one or more selected from ethylenediamine, trimethylenetetramine, tetraethylenepentamine polyamine, isophoronediamine, polypropylenediamine, triethylene glycol diamine and polyoxypropylenetriamine.

4. The coating film according to claim 2, wherein a ratio of an equivalent weight of the active hydrogen in the hardener to an equivalent weight of the isosorbide epoxy is 0.7 to 0.95.

5. The coating film according to claim 1, wherein the hardening accelerator is one or more of an imidazole-based compound and a tertiary amine-based compound.

6. The coating film according to claim 5, wherein the imidazole-based compound is one or more selected from imidazole, 2-methylimidazole, 2-ethyl-4-methylimidazole and 1-cyanoethyl-2-ethyl-4-methylimidazole, and the tertiary amine-based compound is one or more selected from tributylamine, benzyldimethylamine, trimethylamine and benzyl dim ethyl amine.

7. The coating film according to claim 1, wherein the silane coupling agent is an epoxy silane-based compound.

8. The coating film according to claim 7, wherein the epoxy silane-based compound is one or more selected from 2-(3,4 epoxycyclohexyl)ethyltrimethoxysilane, 3-glycidoxypropyltrimethoxysilane, 3-glycidoxypropylmethyldiethoxysilane and 3-glycidylpropyltriethoxysilane.

9. The coating film according to claim 1, wherein the coating film has a thickness of 1 to 100 μm.

* * * * *